United States Patent [19]
Fantozzi

[11] 3,971,919
[45] July 27, 1976

[54] PROGRAMMABLE BILLING SYSTEM

[75] Inventor: Louis J. Fantozzi, Penfield, N.Y.

[73] Assignee: Xerox Corporation, Stamford, Conn.

[22] Filed: Feb. 7, 1975

[21] Appl. No.: 548,037

Related U.S. Application Data

[63] Continuation of Ser. No. 344,321, March 23, 1973, abandoned.

[52] U.S. Cl. .................. 235/92 SB; 235/92 AC; 235/92 CC; 235/92 PE; 235/92 R; 355/14
[51] Int. Cl.² .................................................. G06B 27/06
[58] Field of Search ........ 235/92 SB, 92 PE, 92 CC, 235/92 AC, 132 E; 355/14

[56] References Cited
UNITED STATES PATENTS 3,358,570   12/1967   Morrill et al. .................. 235/92 SB
3,453,418   7/1969   Somlyody .................. 235/92 AC Primary Examiner—Joseph M. Thesz
Attorney, Agent, or Firm—Earl T. Reichert

[57] ABSTRACT

A programmable billing meter system includes a first meter for recording the total copies produced by a copying machine, a second meter for recording copies made up to a first break point and a third meter for recording copies made from a first break point to a second break point. A programmable network receives copy count data from a series of binary counter, and controls the entry of the count into the appropriate meter the network being capable of being rapidly and conveniently programmed so that the break points can be easily changed if desired.

1 Claim, 3 Drawing Figures

PROGRAMMABLE BILLING SYSTEM

This is a continuation of U.S. application Ser. No. 344,321, filed on Mar. 23, 1973, now abandoned.

BACKGROUND OF THE INVENTION

This invention relates to a programmable billing system suitable for use in an automatic reproducing machine or any device for carrying out a series of re-occurring events.

More specifically, the present invention involves a billing system having a programmable break point decoder whereby a side variety of billing schemes can be rapidly and efficiently programmed into a copy machine. Conventionally, in most copier environments, the customer is billed at varying rates depending upon the number of copies produced during any particular copy run. For example, a higher billing rate may be applied for any number of copies made up to a first break point, a second lower rate for copies produced from the first break point to a second break point and a yet lower rate for all copies beyond the second break point.

Heretofore, in most copying machines, billing information was generally acquired by sensing some machine occurrence, such as support material feeding or the like, and sending this information directly to a billing meter system via a hard wired electrical network. As such, the billing system was only capable of identifying and recording one billing scheme. Furthermore, when a machine malfunction occurred and a copy run had to be temporarily interrupted, the original count was generally lost and, as a consequence, erroneous billing information was recorded upon the re-institution of the run. An example of such a hard wired prior art billing system can be found in U.S. Pat. No. 3,358,570.

It has been found in practice that the billing rates charged to customers by most machine suppliers will change from time to time during the lifetime of a single copying machine. These changes in billing rates, of course, necessitate a reorientation of the billing meters which, in the hard wired system, involves a relatively long machine down time or, in extreme cases, even recalling the machine from the field. This, of course, inconveniences the customer and results in considerable cost to the supplier.

SUMMARY OF THE INVENTION

It is therefore an object of the present invention to improve billing meter systems used in copying machines or the like where a series of re-occurring events are to be recorded.

A further object of the present invention is to provide a billing meter system which can be rapidly and conveniently programmed in the field.

Yet another object of the present invention is to reduce the amount of time required to change the billing scheme in an automatic machine.

Still another object of the present invention is to provide a programmable logic system for recording various events carried out by an automatic copying device.

A still further object of the present invention is to provide a billing recording system for use in a copying machine having the capability of storing and holding copy information wherein the integrity of the count is preserved when a copy run is interrupted.

These and further objects of the present invention are attained by means of a programmable billing system providing for a wide flexibility in programming billing rate break points into a billing meter system wherein a pulse train indicative of the copies produced is fed into a plurality of binary counters capable of storing said information, a programmable decoder means for interrogating the information stored within said counters and generating output signals in response to preprogrammed copy count occurrences and a gating means operatively associated with said programmable decoding means for entering copy count data into billing meter system in accordance with the break point information preprogrammed into the decoder means.

DETAILED DESCRIPTION OF THE INVENTION

Figure 1:
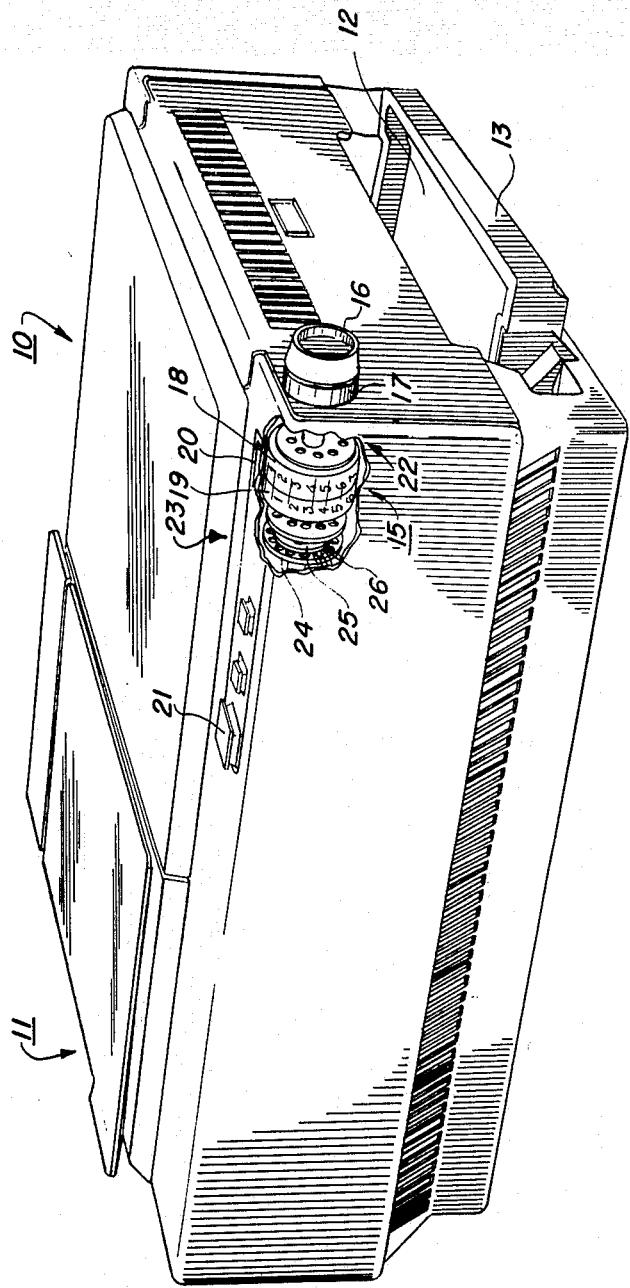
FIG. 1 is an isometric view of an automatic copying machine employing the programmable billing system of the present invention.

Although the billing system of the present invention is not necessarily so limited in its usage, it will be herein explained in conjunction with an automatic copying device employing the reusable xerographic process. As it is widely known and used in the art, the reusable xerographic process involves recording a light image of an original to be reproduced upon the surface of a moving photosensitive plate in the form of a latent electrostatic image; developing the latent image, preferably by means of a dry toner material; and then transferring and fusing the developed image onto a sheet of final support material such as paper or the like. A xerographic copier 10 of this type is illustrated in FIG. 1. The original to be reproduced is supported in a stationary condition at exposure station 11. A supply of support material 12 is operatively positioned within the machine by means of a cassette 13. Individual sheets are forwarded from the stack seriatim through the transfer and fusing stations wherein the xerographically created images are reproduced upon the support sheet to form a permanent record of the original. The copy is then delivered into a collecting tray where it is temporarily stored until such time as it is removed by the machine operator.

A copy selector indicator and switching arrangement, generally 15, is also produced by which the machine operator can select the desired number of copies to be reproduced. The selector assembly includes two manually operated selectors, a units selector 16 and a tens selector 17, which control the positioning of a unit indicator dial 18 and a tense indicator dial 19, respectively. The drum type indicators 18 and 19 have a series of numerals inscribed about the outer periphery thereof and are rotatably supported within the machine frame. At the operator's option, the desired number of copies to be produced during any particular copy run is dialed into a viewing window 20 and the stary of copy switch depressed thus initiating the copy run.

In this particular arrangement, each indicator drum is adapted to present a number within the window which is representative of an order within the decimal system. For example, the lower order (units) number is represented by the numeral presented in the window by units drum 18 located at the right hand side of the drum array. Similarly, the next higher order (tens) number is represented by the number presented within the window by the adjacent or left hand drum 19. A direct reading of the number of events up to and including 99, which the machine is capable of being programmed to carry out, is thus presentable within the viewing window. Although only two orders of magnitudes are provided for in this particular arrangement, it should be clear from the present disclosure that the amount of higher orders can be similarly provided without departing from the teachings of the present invention.

A pair of rotary switches 22 and 23 are also operatively associated with each of the indicator drums. Each switch is capable of generating an electrical signal indicative of an order displayed within the viewing station. The switches are conventional rotary switches known and used in the art and include a fixed support 24 and a movable contact member 25 which is arranged to turn with the associated indicator drum. A series of fixed contacts 26 are supported about the periphery of the fixed support which co-act with contacts mounted on the movable member to generate a binary coded signal of the order displayed in the window by the units and the tens indicator drums. The signals generated by the two rotary switches are sent to the machine control circuitry which is programmed to identify the coded signal and condition the machine processes to carry out the preselected number of occurrences or events. For further information concerning this type of logic system reference is had to copending U.S. application Ser. No. 348,829 filed in the same of Fantozzi.

During a copy run, the machine control circuitry provides a train of pulses to the billing sub-system, each of which is indicative of the production of a single copy. The train of pulses delivered to billing system will continue until such time as the unit dial setting and the tens dial setting have been satisfied, i.e. the desired number of copies produced for any given copy run has been reached. In the event that the dial setting is changed to a count which is lower than the number of copies originally selected, but greater than the number of copies actually produced during that particular copy run, a "greater than" condition is noted by the machine logic and the train of pulses to the billing system is terminated. Upon the completion of any copy run, or when a "greater than" condition is detected, the machine logic begins a cycle out procedure which includes conditioning the control circuitry to accept new copy run data.

After the desired number of copies have been selected and the print switch actuated thus placing the machine in a copy mode of operation, the train of copy count pulses will continually be passed to the billing system until the dial setting is satisfied or until an interrupted condition, such as the occurrence of a paper jam or the like, is sensed. The control circuitry, upon the detection of an interrupted condition, will stop the copy count at the point of interruption and subsequently pick up the count when the interrupted condition is corrected. As will be explained below, the billing system is provided with a memory which is capable of preserving the integrity of the billing scheme during periods of interruption thereby billing information is retained and the count picked up at the point of interrupt when such an event occurs.

Figure 2:
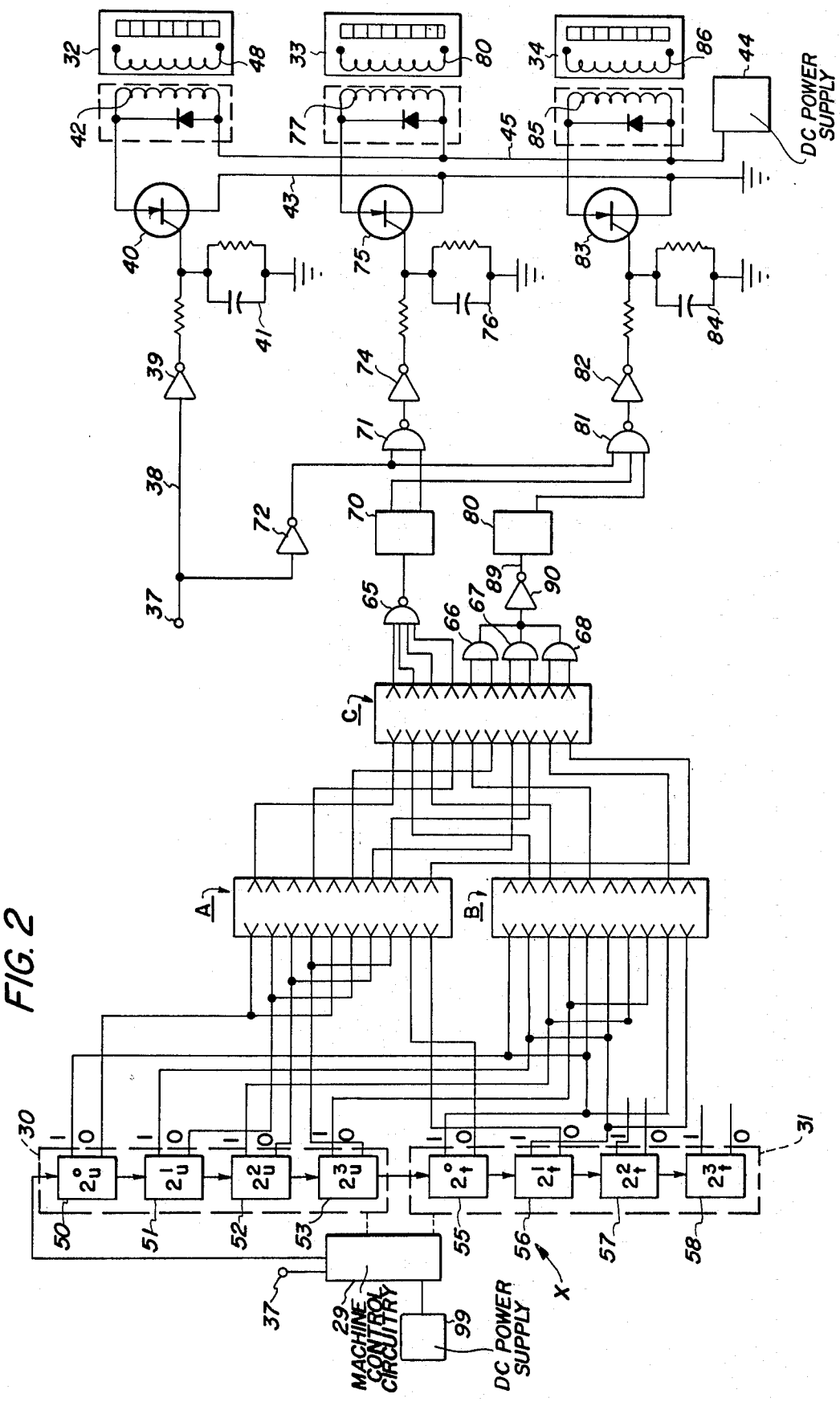
FIG. 2 is an electrical schematic illustrating the programmable logic of the instant billing system.

At the beginning of any copy run, the train of clocking pulses generated by the machine control circuitry 29 is fed to the units section 30 and the tens section 31 of the copy or programmer counter X, and through an amplifier drive system to a total copy count billing meter 32 (FIG. 2). During the period when the machine controller is comparing the clocking pulses with the dial settings, the billing logic system continually senses the count accumulated in the programmer counters, decodes the data stored therein in response to a preset program, and records this information in a first break point billing meter 33 and a second break point meter 34 in accordance with the program. As will be explained in greater detail below, the desired break points are programmed into a decoder network whereby copies made up to a first break point are recorded in billing meter 33 and copies made from the first break point to a second break point are recorded in billing meter 34. Although the present disclosure involved a three meter billing system utilizing a two break point scheme, it should be clear to one skilled in the art that the system can be expanded or compressed to include any number of meters and break points without departing from the teachings of the present invention.

As illustrated in FIG. 2, three billing meters 22, 33 and 34 are herein utilized to carry out a two break point billing scheme. The first meter 32 is adapted to continually record a total or cumulative count of all copies made during any given copy run. This is accomplished by feeding the train of copy count pulses from the machine control circuitry 29 via input terminal 37 and line 38 to a buffer amplifier 39. The buffer, in turn, drives SCR 40 and an accompanying RC suppression network 41. The anode side of the SCR is electrically connected to one side of an impedance coil 42. The other side of the coil is connected to a 26 volt DC power supply 44 via line 45. In operation, pulsing the buffer drive causes the SCR to conduct for the same pulse width duration thus providing a path for current to flow from the power supply through coil 42 to ground. This, in turn, causes the coil to be periodically energized, each time a copy count pulse is generated. The coil 42 is impedance coupled to a pick up coil 48, in the total copy billing counter circuitry, which serves to increment the counter one count every time the SCR conducts.

Sensing data to the two break point meters 33 and 34 is herein provided by means of the binary coded programmer counter X, the latter including the units section 30 and the tens section 31. In practice, each section of the programmer counter X is made up of a plurality of flip-flops which are energized at the beginning of each copy run. The train of pulses generated by the main control logic clocking system is accepted into programmer counter whereby the lowest order is stored in the first flip-flop of the series and the next higher order in each succeeding flip-flop thereof. The units section of the programmer counter X is made up of four flip-flops 50–53 and the tens section counter is made up of four flip-flops 55–58, all of the flip-flops being capable of accepting and storing binary coded decimal counts.

As illustrated in FIG. 2, the 1 and 0 outputs of each flip-flop in the two sections are electrically connected to a programmable decoder network made up of three connectors A, B and C. Each of the connectors is provided with ten input terminals which are electrically connected to ten corresponding output terminals. For simplicity and purposes of explanation, the input terminals and output terminals of each connector will be referenced J1–J10 in a descending order as viewed in the drawing. The 0 side of each flip-flop in the units section and the two lower order tens counter flip-flops are electrically wired, as shown in FIG. 2, to the input terminals of connector A, while the 1 side is electrically connected to the input terminals of the B connector. As will be explained below, the outputs of the A and B connectors connected via repositionable jumper wires, to the connector C input whereby information is recorded in the meters in accordance with a preset billing scheme.

The ten output terminals of the C connector are electrically connected to a logic gating network made up of gates 65-68 serve to control the incrementing and disabling of the first and second break point billing meters 33 and 34, respectively. The first four outputs, J1–J4 of the C connector pick up, via the preprogrammed connector network, the copy count information stored in the units section 30 and feeds this programmed information to NAND gate 65. Similarly, the last six outputs of the C connector, J5–J10, pick up copy count information, also provided through the connector network, that is stored in the tens section 31 and passes this preprogrammed information to a gating network made up of AND gates 66, 67 and 68. In this particular arrangement, a set signal from gates 65 and 90 will only be generated when the preprogrammed first and second break points are reached. When the first preprogrammed break point occurs, the four inputs to gate 65 will be set to a logical 1. By the same token, upon the occurrence of the second break point count, the last six outputs of connector C, which are fed to the AND gate network, will also be set to a logical 1 thus enabling the gate.

At the beginning of each copy run, that is, when power is provided in the billing system, the first break point latch 70, a flip-flop in the first break point meter control circuit, and the second break point latch 80, a flip-flop, in the second break point control circuit, are initially set to a 0 condition. The train of copy count pulses entering the total copy count billing meter are also fed to the first break point control gate 71 and second break point control gate 81. With latch 70 in a 0 condition the gate 71 is enabled and the copy count pulses are passed to the first break point drive. Prior to the first break point occurrence, the copy count pulses are passed through gate 71 to a buffer amplifier 74 which drives SCR 75 and the RC suppression network 76. The SCR is connected to power supply 44 through a coil 77 in a manner similar to that described above in reference to SCR 40, whereby coil 77 is energized each time a copy count pulse passes control gate 71. In this manner, pick up coil 80, in meter 33, is caused to increment the meter one count for each signal passed by the first break point control gate.

The control gate 71 will continue to accept pulses from the main machine logic until such time as the first preprogrammed break point is reached. At this time, all the inputs to NAND gate 65 are set at a logical 1 and a signal is passed to the latch 70 changing the state of the latch from a logical 0 to a logical 1. This, in effect, disables the first break point counter 33 by disabling the control gate 71.

With the latch 70 changed from a logical 0 to a logical 1, an enabling signal is passed from latch 70 to the second break point control gate 81. At this time, the second break point latch 80, which was also initially set to a logical 0 condition by the machine control circuitry has conditioned the gate 81 to accept the enabling signal and pass pulses from the main copy count train to the second break point meter. Thereafter, each time that a pulse in the initial clocking pulse train is generated, it is passed through the second break point control gate to buffer 82 which drives SCR 83 conductive and the RC network 84. This, in turn, energizes coil 85 thereby incrementing the second break point counter 34 through its pick up coil 86.

As in the case of the first break point network, the second break point programmer counter similarly will continue to record the clocking pulses generated by the main machine logic until such time as the second preprogrammed break point count is reached.

In practice, the flip-flops of the tens section 31 of the programmer counter X are arranged to store copy count data in a binary coded decimal form simultaneously along with the first units of the programmer counter. The J5 through J10 input terminals of connector C are electrically connected in a preselected manner to the outputs J5 through J10 of the two connectors A and B whereby the second break point data is preprogrammed into the system. The first two outputs of connector C are fed to a first AND gate 66, the second two outputs are fed to a second AND gate 67 while the remaining two outputs, or the tens outputs, are fed to AND gate 68. The outputs of this gating network are brought out through a common lead 89 to the second break point inverter latch 80 via an inverter 90.

As explained above, the latch 80 is initially set, at the beginning of any copy run, to a 0 state and holds the control gate 81 in a condition to pass copy count information when the first break point latch 70 is made at the occurrence of the first break point pulse. When the second preprogrammed break point count is allowed to pass through the connector network, the inputs to gates 66, 67 and 68 are all set to a logical 1 thus enabling the gates which causes the condition of the second break point latch to be changed. This, in turn, disables the second break point control gate 81 thereby disabling meter 34. For the remainder of the copy run, the total number of copies produced continues to be registered in the total copy count billing meter 32 while the other two break point meters 33 and 34 remain disabled. Copies made beyond the second break point can be found by simply subtracting the second break point reading and the first break point reading from the total copy count reading.

The preprogrammable feature of the present invention will be explained with further reference to FIG. 3 with reference to a billing scheme wherein the first break point is programmed to occur at the sixth copy count and the second break point is programmed to occur at the eleventh copy count. It should be understood that the break points occurrences have herein been selected for explanatory purposes only and any break points within the acceptance range of the preprogrammer counter X can be similarly utilized without departing from the teachings of the present invention.

Figure 3:
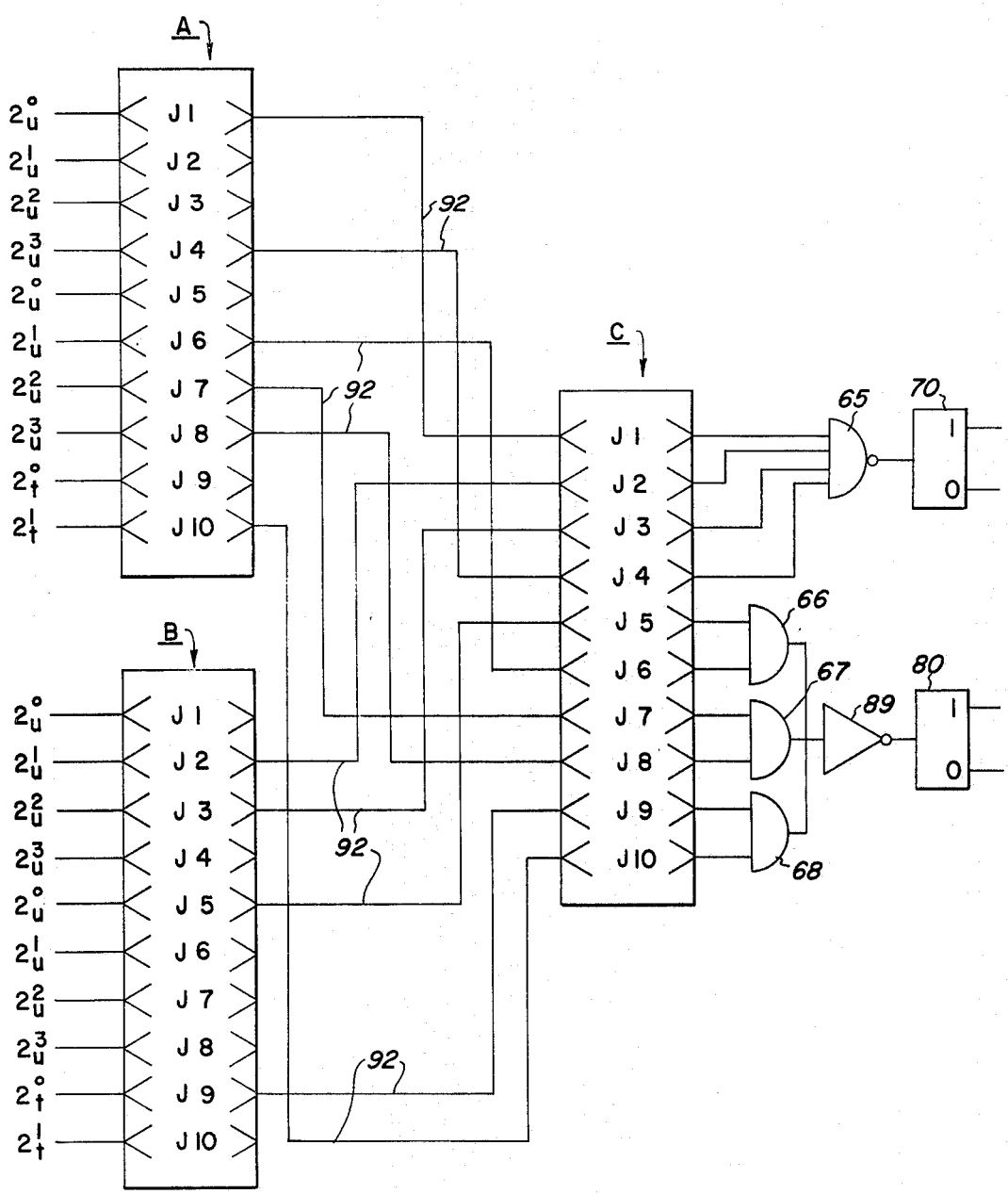
FIG. 3 is an electrical schematic illustrating, by example, a programmable decoder utilized in the present invention.

Referring now to FIG. 3, a series of repositionable wires 92 are employed to connect the input terminal, J1 through J10, of connector C and ten preselected output terminals of connectors A and B. By means of the wiring arrangement herein described the initialized state of the first break point latch will be changed at a copy count of six while the state of the second break point latch will be changed at the occurrence of a copy count of 11. To disable the first break point meter, i.e. change the state of latch 70, the terminals J1 through J4 of the C connector, which are connected to the first break point gate 65, must all reach a logical 1 at the occurrence of the predetermined count of 6.

When a copy count of six is reached, the units section 30 will be in the following condition:

| FLIP - FLOP | LOGICAL STATE at "1" output | COUNT |
|---|---|---|
| 50 | 0 | $2^0 \times 0 = 0$ |
| 51 | 1 | $2^1 \times 1 = 2$ |
| 52 | 1 | $2^2 \times 1 = 4$ |
| 53 | 0 | $2^3 \times 0 = 0$ |

The decoder network, made up of connectors A, B and C is preprogrammed to sense the first break point count by interrelating the input terminals of the C connector with the A and B connector as follows:

| | CONNECTORS | | |
|---|---|---|---|
| | A | B | C |
| TERMINAL CONNECTIONS | J1 | | J1 |
| | | J2 | J2 |
| | | J3 | J3 |
| | J4 | | J4 |

As can be seen, with the preprogrammed arrangement, the output terminals J1 through J4 of the C connector will all reach a logical 1 only when the first preprogrammer count reaches a binary count of 6. At this time, latch 70 is switched and the first break point meter is disabled.

Similarly, the desired second break point count of 11 is sensed by the programmer counter X when the following conditions are reached:

| FLIP-FLOP | LOGICAL STATE at "1" output | COUNT |
|---|---|---|
| 50 | 1 | $2^0 \times 1 = 1$ |
| 51 | 0 | $2^1 \times 0 = 0$ |
| 52 | 0 | $2^2 \times 0 = 0$ |
| 53 | 0 | $2^3 \times 0 = 0$ |
| 55 | 1 | $2^0 \times 10 \times 1 = 10$ |
| 56 | 0 | $2^1 \times 10 \times 0 = 0$ |

By arranging the repositionable jumpers 92 associated with the last six input terminals to the C connector with the output terminals of the A and B connector in the following manner, the three gates feeding information to the second break point latch 80 will all be placed at a logic 1 state when a binary count of 11 is reached thus enabling gates 66–68 and setting latch 80.

| | CONNECTOR | | |
|---|---|---|---|
| | A | B | C |
| | | J5 | J5 |
| TERMINAL | J6 | | J6 |
| CONNECTIONS | J7 | | J7 |
| | | J8 | J8 |
| | | J9 | J9 |
| | J10 | | J10 |

With the connectors wired in the above-noted manner, the first break point meter will record the first five copies of any particular copy run and then be inactivated on the six copy count and the count is picked up by the second break point meter. The second break point meter continues to record copy counts up to 11. At this time, or on the eleventh copy count pulse, the second break point meter is disabled and all succeeding copies made during this particular copy run will be recorded only as part of the cumulative count picked up by the total copy billing meter 32.

As can be seen, in this particular disclosure, only one arrangement has been discussed. It should be clear to one skilled in the art, however, that the number of break points can also be compressed and expanded without departing from the teachings of the present invention.

As shown in FIG. 2, a source of DC power 99 is provided, via the machine control circuitry 29, to both the units and tens sections of the programmer counter X. This source of power serves to hold the flip-flop networks involved energized during the periods when a copy run is interrupted so that the memory function of the counter X is not erased while the interrupt condition is being corrected. At the end of a copy run, the power from the DC supply is inactivated, thus clearing the counters preparatory to re-instituting a new copy run.

While this invention has been described with reference to the structure herein described, it is not confined to the details as set forth and this application is intended to cover such modifications and changes that may come within the scope of the following claims.

What is claimed is:

1. A programmable billing meter system for use in a copying machine including:
   a counter arranged to receive a copy count pulse each time the machine produces a copy, and to store the copy count information, the counter including a series of flip-flops,
   a plurality of billing meters, and
   programmable means electrically interposed between the counter and the billing meters for enabling and disabling the meters upon the occurrences of predetermined copy counts whereby copy count information is entered into the billing meters in programmed order, the programmable means including a first connector for sensing the O state of each flip-flop in the counter array, a second connector for sensing the 1 state of each flip-flop in the counter array, a third connector having outputs which are gated to the billing meters, repositionable electrical leads between the outputs of the first and second connectors and the inputs of the third connector capable of being arranged in a programmed manner.

* * * * *